June 29, 1965 R. BECKMAN ETAL 3,192,099
FURNITURE PANEL
Filed Jan. 3, 1963 2 Sheets-Sheet 1

INVENTORS
RONALD BECKMAN
FREDERICK J. FOYSTER
BY
Price & Heneveld
ATTORNEYS

June 29, 1965

R. BECKMAN ETAL 3,192,099

FURNITURE PANEL

Filed Jan. 3, 1963

INVENTORS
RONALD BECKMAN
FREDERICK J. FOYSTER
BY
*Price & Heneveld*
ATTORNEYS 3,192,099
FURNITURE PANEL
Ronald Beckman, New York, and Frederick J. Foyster, Brooklyn, N.Y., assignors to Herman Miller, Inc., Zeeland, Mich., a corporation of Michigan
Filed Jan. 3, 1963, Ser. No. 249,230
7 Claims. (Cl. 161—43)

This invention relates to lightweight, rigid furniture panels useful for desk tops, table tops, shelving, and space dividers among other uses, and more particularly to a sturdy, rigid, laminated panel having balanced internal forces and moisture resistance, thereby being free from tendencies to warp. The term "furniture panel" when used herein identifies a rigid furnishing panel useful for convenience or decoration.

Rigid panels of modern furniture are often formed from an under-layer or core covered by a layer of wood veneer or plastic. The cover layer is for decorative purposes, and for protection against mechanical, chemical, and moisture damage. The core is usually formed from special sections of high quality wood such as poplar, or from compressed, impregnated wood chips and saw dust. Straight grain, clear core stock of woods such as poplar is becoming scarce and excessively expensive.

Even with the finest quality core stock, however, definite warpage problems often arise since the wood veneer has a different moisture absorption capacity than the core stock. This causes differential expansion between the core and veneer with moisture absorption, thereby resulting in warpage. This warpage is further amplified when the veneers on opposite sides of the panel are of different woods or in some cases even of a different grade of the same wood. Such is often necessitated by economic reasons. In fact, tendencies of laminated wood products to warp are not eliminated except by complete impregnation with a material such as phenol formaldehyde. Impregnation requires extensive and expensive equipment.

Chip board cores are also expensive to fabricate, and are not satisfactory for many core uses. Briefly, therefore, in spite of the great pains and expense put forth for these prior panels, such materials frequently continue to be characterized by definite tendencies to warp, bend and "walk." These characteristics are not too noticeable on smaller items, but on longer articles such as conference tables, executive desks and shelving, progressive warping and bending is often clearly noticeable. This inherent problem sometimes even necessitates scrapping of expensive furniture.

Those in the field have long been desirous of a panel free from warpage tendencies, strong and rigid enough to be free from bending even in long spans, and also much less expensive to produce than conventional panels. Obviously, these desired advantages are normally inconsistent with each other.

It is therefore the principal object of this invention to provide an inexpensive panel, especially a furniture panel for desk tops, table tops, shelving, space dividing partitions, and similar products, that will possess the excellent strength and rigidity without inherent tendencies to warp or bend. The non-warping, rigid inventive panel is capable of fabrication from materials that are readily available, and generally inexpensive. It utilizes paper sheet material as one chief construction material. The panel is adaptable to fabrication on a high speed, mass production basis. It is formed completely from continuous sheets of materials, largely paper and foamed plastic sandwiches. The sheet materials can be handled on a continuous, rapid basis. The novel panel has excellent rigidity and strength. It has light weight. It has symmetry of construction and balanced internal forces, thereby eliminating one chief cause of warpage. It is unaffected by moisture thereby eliminating another chief contributory cause of warpage and bending. Its lightweight, sturdy construction enables its use as space divider, panels, desk tops, table tops, shelving, and many other related uses. It can be readily drilled for mounting of necessary brackets. It receives and firmly anchors mounting screws. The novel panel is capable of receiving varied decorative coverings or skins such as wood veneer, plastic, and metal.

These and other objects and advantages of this invention will be apparent upon studying the following specification in conjunction with the drawings, in which.

Basically, the inventive panel comprises a rigid, corrugated, foam sandwich core enclosed by a jacket having a decorative exterior. The sandwich is laminated of a pair of flexible, or at least bendable, enclosing sheets, preferably heavy kraft paper, and an intermediate rigid foam plastic layer that is relatively stiff. I.e., the foam is a "rigid" as opposed to a "flexible" foam, but it is bendable when creased. It is preferably of the closed cell type to control moisture migration. The enclosing envelope, bonded to the corrugated core, is formed of a pair of flexible sheets. These are preferably heavy kraft paper, having a reinforcing layer of greater tensile strength therebetween. This layer has tensile and compressive qualities, such as a steel wire mesh or a layer of bi-directional glass fibers. The decorative coating may be of a vinyl material such as "Naugahyde," or wood veneer, or a metallic skin with or without a decorative surface finish.

Figure 2:
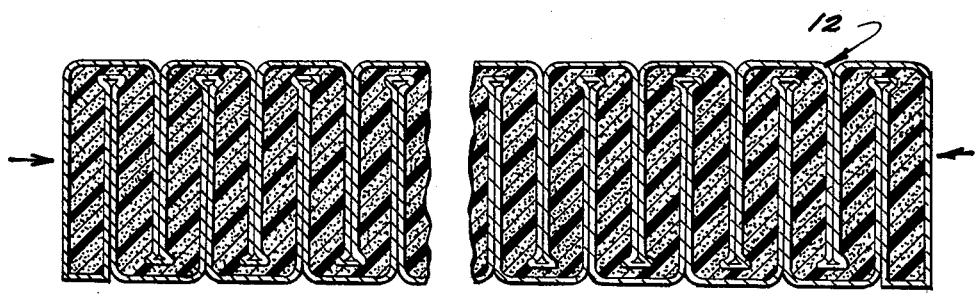
FIG. 2 is a sectional elevational view of the sandwich in FIG. 1 after being folded or corrugated.
Figure 3:
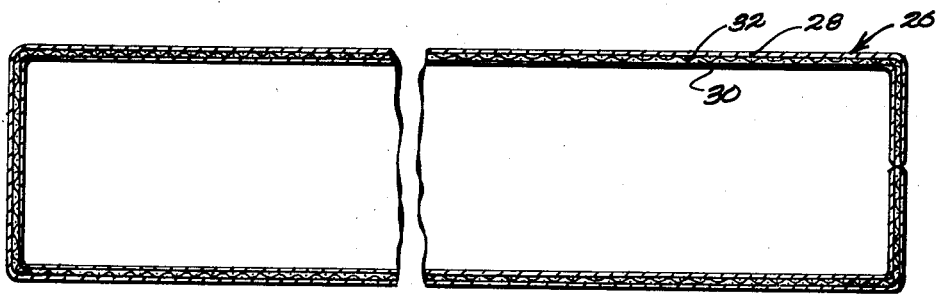
FIG. 3 is a reinforced paper envelope forming a jacket to enclose and further rigidify the core of FIG. 2.
Figure 4:
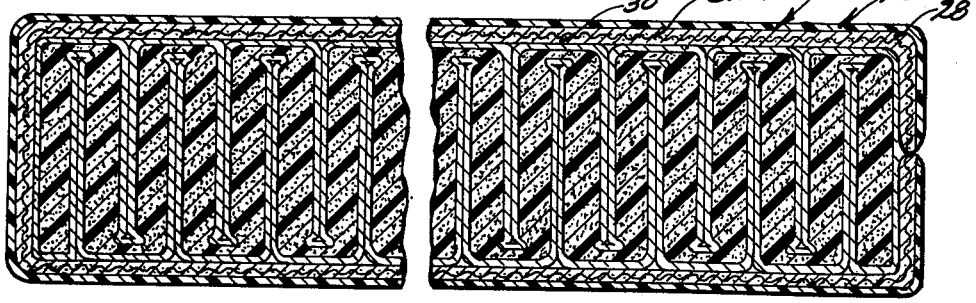
FIG. 4 is a sectional elevational view of the complete panel, including the jacket bonded to and surrounding the corrugated sandwich and having a decorative exterior film or web thereon.

Referring to the drawings, in FIG. 4 the complete, laminated, rigid furniture panel 10 is shown formed from the stiff corrugated core sandwich 12 illustrated in FIG. 2, and the envelope or jacket 26 illustrated in FIG. 3.

Figure 1:
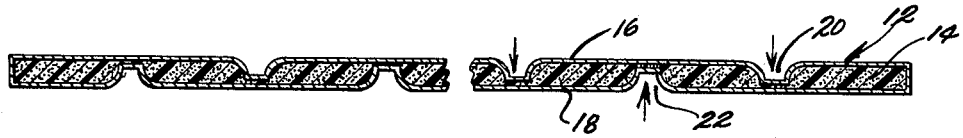
FIG. 1 is a sectional elevational view of a paper and plastic foam sandwich which, when corrugated, forms the core of the novel panel.

The core or sandwich 12 comprises a layer of relatively stiff foamed plastic such as rigid polystyrene or polyurethane foam, bonded to and between a pair of heavy kraft paper sheets 16 and 18 (FIG. 1). The foam is preferably of the closed, sealed cell-type to completely eliminate possible moisture absorption. A series of elongated crease or score marks 20 formed alternately in the face and back of the sandwich by crushing the foam, enable the sandwich to be folded. These crease marks not only provide space for the adjacent sandwich sections to neatly fold together, but also compress or crush the stiff plastic foam sufficiently to allow it to bend readily without breaking or bulging. These creases extend longitudinally over the length or width of the sandwich. They may be readily formed by passing the sandwich through a set of die rollers (not shown).

After the sandwich is created a resin adhesive, preferably one which is completely or almost completely resistant to moisture, is applied over the front and back of the sandwich. As the structure is folded into the accordion-shaped core in FIG. 2, the folds are pressed and adhered into a tight, parallel, face-to-face and back-to-back relationship. The resin adhesive is cured or permitted to set either at air temperatures or elevated temperatures to bond the folds securely together. The curing temperature must be relatively low because of the foam. The adhesive used is preferably a contact type. In some instances, it may be some other suitable adhesive that will retain the bond with extended use and under stress such as an epoxy based material.

The corrugated core 12 is jacketed or enclosed within envelope 26. This envelope is preferably formed basically of two sheets or layers 28 and 30 of flexible, heavy kraft paper. Between them is a layer of reinforcing, relatively stiff material having greater tensile strength, and having compressive strength when prevented from bending. Preferably a steel wire mesh 32 is used. Alternatively, it may be a meshlike layer of bi-directional glass fibers, i.e. the fibers are in at least two directions, and usually more. The paper layers are bonded together through the mesh with a resin adhesive. This jacket serves to tie the corrugated core tightly together. It also prevents bending of the panel by lending tensile strength on one side and compressive strength on the other. It further affords a smooth surface useful for a desk, table top, or other use. The paper sheets for the jacket, and if desired for the sandwich, can be impregnated with a resin such as phenol formaldehyde to render them completely moisture resistant. This is especially advantageous for tropical or sea shore areas.

Before the envelope 26 is applied, all surfaces of the exposed corrugated core are coated with an adhesive such as an epoxy or polyester. The core is then wrapped tightly with the envelope so that it is securely bonded and held completely rigid. The resulting core, formed of parallel, tightly adhering, stiff, compacted sandwich folds, all wrapped securely with the wire-reinforced, adhering jacket, possesses remarkable strength and rigidity. The jacket has a tremendously large area of adhering contact with the sandwich folds. The folds, as shown in FIG. 2, are flattened at the ends to form a substantially continuous support surface and adhering surface for the jacket. Consequently, the jacket cannot pull away and buckle under compressive forces on one side of the panel. Further, "telegraphing" of underlying surface configuration is minimized by the continuous surface of the folds.

Figure 5:
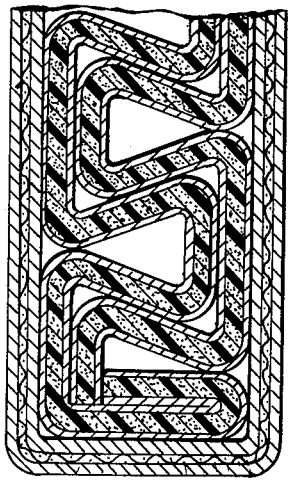
FIG. 5 is a fragmentary perspective view of one type of panel and construction.
Figure 5:
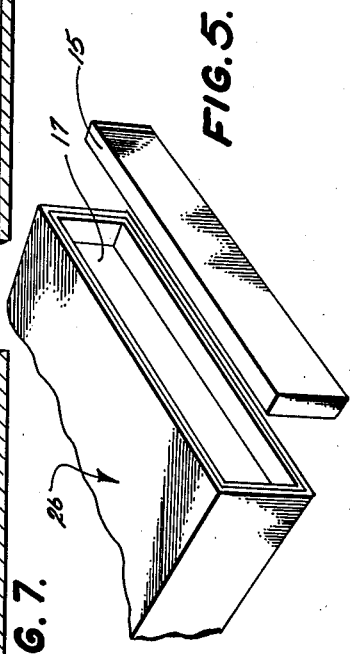

Over the envelope is a decorative layer or skin 40. This may comprise a conventional wood veneer, a vinyl coating such as "Naugahyde," or some other decorative material such as a metal sheath, with or without a decorative pattern. The skin can be applied either before or after the envelope is attached to the corrugated sandwich. The skin may be stapled, adhered, screwed or otherwise held in place. It may cover one side or both sides of the panel, and can enclose the edges as shown. Alternatively, additional end blocks or fillers 15 of high quality wood or other material can be secured adjacent the fold end 17 inside the jacket 26 as in FIG. 5. This can be inserted after the jacket is wrapped on the corrugated sandwich, or prior to wrapping.

The resulting panel is rigid, lightweight, bend resistant, sturdy, and aesthetically appealing. Internal forces are balanced. It is moisture repellant and resistant. It has high surface tensile strength. The material can readily be drilled or otherwise apertured for reception of leg-holding screws or clamping brackets. It anchors screws well by entanglement thereof into the wire or fiber glass mesh.

Modifications

Figure 6:
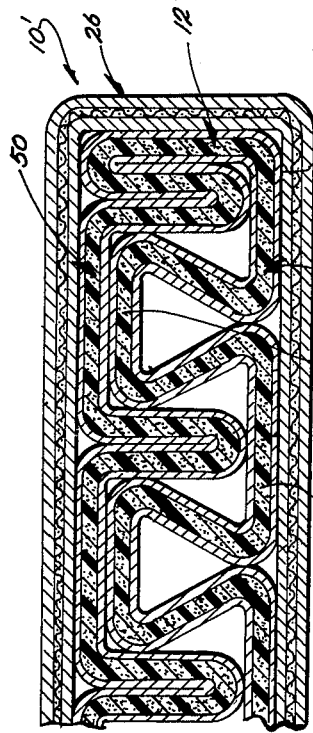
FIG. 6 is an elevational sectional view of a modified form of the novel panel.
Figure 7:
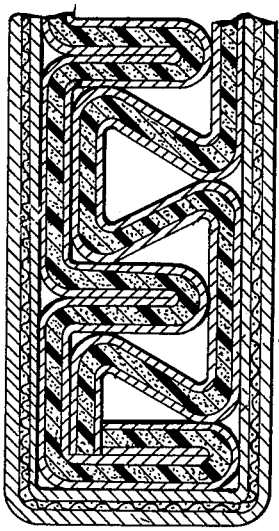
FIG. 7 is an elevational sectional view of another modification of the novel panel.
Figure 7:
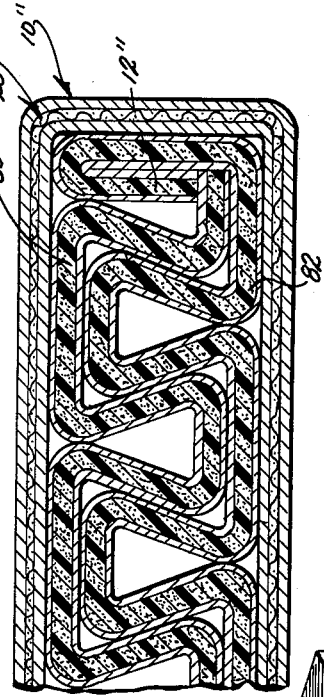

Instead of the parallel-fold configuration illustrated in FIGS. 2 and 4, the fold constructions illustrated in FIGS. 6 and 7 can be utilized.

In FIG. 6, the rigid panel 10' is formed of an enclosing envelope 26 like that in FIG. 4, around a modified rigid core 12'. This core includes two interfitting core parts 50, of dissimilar configuration, and 52. Upper core part 50 comprises a series of adjacent recurrent, generally U-shaped folds. The backs of the folds are flat and in contact with adjacent folds to form a substantially continuous upper surface. This provides a large amount of adhering and support surface for the jacket. Lower core part 52 comprises a series of spaced triangular folds 58 and alternate trapezoidal folds 60. The sides of the triangles abut to form closed triangles. The bases of the triangular folds fit between respective legs of the U-shaped folds against the inside base of the U. The legs of the U-shaped folds fit within the respective adjacent trapezoidal folds 60. Two legs of each trapezoid also comprise two legs of the adjacent triangles. The adjacent bases of the trapezoids abut each other to form a substantially continuous lower support and adhering surface for the jacket.

The interfitting folds have a substantial amount of adhering contact together so as to enable adhesives to rigidify and integrate the elements. If desired, the cavities between the folds may also be filled with a foamed resin or other suitable material. The folds extend over the length or width of the panel.

In FIG. 7, modified panel 10" utilizes the enclosing jacket 26 of FIG. 3. Core 12" is formed of two similar portions 80 and 82. Each portion comprises alternate closed triangular and adjacent trapezoidal folds interfitting respectively with trapezoidal and close triangular folds on the other portion. The bases of the trapezoids are in abutting contact with each other, and form substantially continuous upper and lower support and adhering surfaces. The core is bonded securely by these surfaces to envelope 26. Since the envelope is thus fully supported, no "telegraphing" occurs. The openings between the folds may be filled. Even without filling, however, the adjacent folds brace each other to form a rigid structure. The abutting walls of the folds are each in complete adhering contact with adjacent walls to further rigidify the panel.

Various advantages in addition to those specifically recited will occur to those in the art upon studying the foregoing forms of the invention. Also, various modifications within the principles taught, to suit a particular purpose may occur to those in the art. These obvious modifications are deemed to be part of this invention, which is to be limited only by the claims attached, and to the reasonably equivalent structures to those defined therein.

We claim:

1. A rigid furniture panel comprising: a rigid core formed of a series of recurrent elongated folds of a sandwich laminated from a pair of bendable enclosing sheets and an intermediate rigid plastic foam bent on spaced creases; and an enclosing envelope of reinforced sheet material enveloping said core and bonded to said core at the ends of said folds, integrating the assembly into a rigid panel.

2. A rigid furniture panel comprising: a rigid core formed of a series of recurrent folds of a sandwich laminated from a pair of bendable enclosing sheets and an intermediate rigid plastic foam bent along spaced parallel creases; the ends of said folds being in abutting relationship and being flattened to form a substantially continuous support and adhering surface; and an enclosing envelope of reinforced sheet material bonded to said core and integrating the assembly into a rigid panel.

3. A rigid furniture panel comprising: a rigid core of laminated rigid foam and paper formed into recurrent elongated folds bonded together; an enclosing envelope bonded to and around said core, including a pair of paper sheets reinforced by an intermediate layer having tensile and compressive strength; and a decorative coating on said envelope.

4. A rigid furniture panel comprising: a rigid core sandwich of rigid plastic foam enclosed in paper-like sheets creased at spaced intervals and corrugated into recurrent folds; the adjacent corrugations of said core being in contact and adhered to each other; an enclosing jacket adhered around said core, including a pair of paper-like sheets reinforced by an intermediate relatively mesh layer having tensile strength, and compressive strength when adhered to said core; and a decorative skin on said jacket.

5. A rigid furniture panel comprising: a corrugated core sandwich of a rigid plastic foam enclosed in bendable sheets; said core being formed of two interfitting parts each having recurrent folds with ends formed along spaced parallel crease lines; the contacting walls of said interfitting parts being firmly adhered together; and a reinforcing jacket adhered tightly around said core.

6. A rigid furniture panel comprising: a decorative, reinforcing enclosing envelope; and a rigid core bonded to and within said envelope and formed of repeated parallel like folds of a rigid plastic foam and paper sandwich; said folds being in tight face-to-face and back-to-back contact and the ends of said folds forming support surface bonded to said envelope.

7. A rigid furniture panel comprising: a decorative, reinforcing enclosing envelope; a rigid core bonded within said envelope and formed of repeated folds of a rigid plastic foam and paper sandwich; said core being formed of two parts, each part having alternate triangular and trapezoidal folds interfitting with and adhered to respective trapezoidal and triangular folds of the other part; the triangular folds being generally in the central portion of the core, and the base portions of the trapezoidal folds forming opposite continuous support and adhering surfaces of the core to which the envelope is bonded.

References Cited by the Examiner
UNITED STATES PATENTS

| | | | |
|---|---|---|---|
| 1,506,855 | 9/24 | McClure | 161—106 X |
| 1,988,843 | 1/35 | Heldenbrand | 161—136 |
| 2,020,639 | 11/35 | Grayson et al. | 161—135 |
| 2,678,686 | 5/54 | Schulz | 161—132 |
| 2,770,406 | 11/56 | Lane. | |
| 2,973,295 | 2/61 | Rodgers. | |
| 2,983,636 | 5/61 | Runton. | |

EARL M. BERGERT, *Primary Examiner.*

MORRIS SUSSMAN, *Examiner.*

UNITED STATES PATENT OFFICE
CERTIFICATE OF CORRECTION

Patent No. 3,192,099　　　　　　　　　　　　　　　June 29, 1965

Ronald Beckman et al.

It is hereby certified that error appears in the above numbered patent requiring correction and that the said Letters Patent should read as corrected below.

Column 2, line 27, for "and" read -- end --; same column 2, line 71, for "created" read -- creased, --.

Signed and sealed this 8th day of February 1966.

(SEAL)
Attest:

ERNEST W. SWIDER
Attesting Officer

EDWARD J. BRENNER
Commissioner of Patents